United States Patent [19]

Charles et al.

[11] Patent Number: 5,061,422

[45] Date of Patent: Oct. 29, 1991

[54] PROCESS FOR PREPARING POLYESTER FEED YARNS

[75] Inventors: Jerry T. Charles, Columbia, S.C.; John F. Hagewood, Mathews, N.C.; Lawrence S. Shea, Camden, S.C.

[73] Assignee: E. I. du Pont de Nemours and Company, Wilmington, Del.

[21] Appl. No.: 497,877

[22] Filed: Mar. 19, 1990

Related U.S. Application Data

[63] Continuation-in-part of Ser. No. 318,798, Mar. 3, 1989, Pat. No. 4,929,698, and a continuation-in-part of Ser. No. 426,372, Oct. 25, 1989, Pat. No. 4,933,427, which is a continuation-in-part of Ser. No. 318,288, Mar. 3, 1989, abandoned, which is a continuation-in-part of Ser. No. 207,077, Jun. 14, 1988, abandoned, and a continuation-in-part of Ser. No. 207,076, Jun. 14, 1988, abandoned, which is a continuation-in-part of Ser. No. 53,308, May 22, 1987, abandoned.

[51] Int. Cl.$^5$ .............................................. D01F 6/84
[52] U.S. Cl. .................................... 264/103; 264/130; 264/210.8; 264/211
[58] Field of Search .................. 264/103, 211, 210.8, 264/130

[56] References Cited

U.S. PATENT DOCUMENTS

| | | | |
|---|---|---|---|
| 3,705,225 | 12/1972 | Taylor | 264/103 |
| 3,748,844 | 7/1973 | Pacofsky | 57/244 |
| 3,977,175 | 8/1976 | Yoshikawa et al. | 57/288 |
| 3,998,042 | 12/1976 | Reese | 57/245 |
| 4,019,311 | 4/1977 | Schippers | 57/245 |
| 4,041,689 | 8/1977 | Duncan et al. | 57/140 J |
| 4,059,949 | 11/1977 | Lee | 428/229 |
| 4,118,534 | 10/1978 | Stanley | 428/370 |
| 4,153,660 | 5/1979 | Reese | 264/103 |
| 4,156,071 | 5/1979 | Knox | 528/272 |
| 4,233,363 | 11/1980 | Cemel et al. | 428/373 |
| 4,444,710 | 4/1984 | Most, Jr. | 264/209.5 |

*Primary Examiner*—Hubert C. Lorin

[57] ABSTRACT

A process for preparing spin-oriented feed yarns that may be processed into flat yarns by draw-warping, involving the use of lower withdrawal speeds than customary hitherto for preparing spin-oriented feed yarns, and preferably low draw-tensions.

6 Claims, No Drawings

PROCESS FOR PREPARING POLYESTER FEED YARNS

CROSS-REFERENCE TO RELATED APPLICATION

This application is a continuation-in-part of application Ser. No. 07/318,798, filed Mar. 3, 1989, and also a continuation-in-part of application Ser. No. 426,372, filed Oct. 25, 1989, now U.S. Pat. No. 4,933,427 itself a continuation-in-part of application Ser. No. 07/318,288 also filed Mar. 3, 1989, such applications filed Mar. 3, 1989 being themselves, respectively, continuations-in-part of applications Ser. Nos. 07/207,077, and 07/207,076, both filed June 14, 1988 now abandoned which were themselves continuations-in-part of application Ser. No. 07/053,308, filed May 22, 1987, now abandoned.

TECHNICAL FIELD OF THE INVENTION

This invention relates to a new process for preparing new polyester yarns, and more particularly new feed yarns of cationic dyeable polyester spin-oriented filaments that are especially suitable for processing by draw-warping into new flat yarns that provide soft pleasing fabrics whose aesthetics can be further improved by napping.

BACKGROUND

Synthetic polyester filaments of poly(ethylene terephthalate were suggested some fifty years ago by Whinfield and Dickson, U.S. Pat. No. 2,465,319, and have been produced commercially for some forty years, and have for many years been the most widely-used and manufactured synthetic polymer filaments, because of their advantageous Properties. Currently, polyester textile yarns are used for many widely-differing articles of apparel requiring polyester yarns in several different forms, and correspondingly manufactured by different processing techniques. Broadly speaking, there are two main categories of polyester apparel yarns, namely spun yarns (from polyester staple fiber, with which the present invention is not concerned) and multifilament (continuous filament) yarns which, themselves, again comprise two main categories, i.e., textured yarns (whose filaments are crimped, usually by false-twisting, with which the present invention is not concerned) and flat (i.e., untextured) yarns. The present invention is concerned with flat multifilament polyester yarns.

Flat yarns are used in several different types of fabrics, e.g., in satins, which may be made by knitting. As was already explained some years ago by Knox, in U.S. Pat. No. 4,156,071, although the high strength of polyester filaments may be of advantage in many fabric applications, there are also certain applications for which it had previously been preferred to use yarns and filaments of lower modulus, such as cellulose acetate, in preference over conventional drawn polyester filament yarns. In other words, the high strength of conventional polyester filaments and yarns, that can be so advantageous for certain end-uses, may have been a disadvantage for other specific end-uses Although many polyester polymers (including copolymers) have been suggested, the most widely manufactured and used polyester hitherto has been poly-(ethylene terephthalate), which is often referred to as homopolymer. Homopolymer has generally been preferred over copolymers because of its lower cost, and also because its properties have been entirely adequate, or even preferred, for most end-uses. Homopolymer is often referred to as 2G-T. Poly[ethylene terephthalate/5-sodium-sulfo-isophthalate] copolyester has, however, also been manufactured and used commercially in considerable quantities for some thirty years, especially for staple, and such copolyester filaments and yarns were first suggested by Griffing and Remington in U.S. Pat. No. 3,018,272. A very desirable feature of this copolyester is its affinity for cationic dyes. Commercially, such copolyester, used for making continuous filaments as well as staple fibers, has contained about 2 mole % of the ethylene 5-sodium-sulfo-isophthalate repeat units, and such copolyester has often been referred to as 2G-T/SSI. An example of a prior suggestion for using spin-oriented multilobal filaments of this copolyester as a draw-texturing feed yarn is in Example VI of Duncan and Scrivener, U.S. Pat. No. 4,041,689. As explained in copending application Ser. No. 07/248,733, filed Sept. 26, 1988 by Butler and Sivils, however, although large quantities of homopolymer DTFY have been manufactured and draw-textured, 2G-T/SSI spin-oriented filaments have not been so satisfactory as DTFY, so the previous commercial manufacture and use of spin-oriented yarns consisting essentially of 2G-T/SSI filaments has been on a very much smaller scale than for homopolymer, despite the advantage of cationic-dyeability.

The present invention concerns the preparation of new polyester feed yarns of these cationic dyeable copolymer filaments, sometimes referred to as (2G-T/SSI), that are especially suited for warp-drawing to provide new flat yarns that are described herein. Such yarns may consist essentially only of such cationic dyeable filaments, or may be heather yarns that are cospun with homopolymer filaments (2G-T) as well.

SUMMARY OF THE INVENTION

Accordingly, there is provided an improved process for preparing an interlaced multifilament feed yarn of denier about 40 to about 300, of high shrinkage about 40% or more, and of high elongation about 80 to about 180%, of spin-oriented poly[ethylene terephthalate/5-sodium-sulfo-isophthalate] copolyester filaments containing about 2 mole% of ethylene 5-sodium sulfo-isophthalate repeat units, by melt-spinning such filaments, applying a spin-finish and interlacing, wherein the improvement is characterized by melt-spinning the filaments at a withdrawal speed of less than about 3000 ypm, corresponding to about 2,750 meters per minute (mpm), and preferably within the range from about 2450 to about 2750 meters per minute, especially about 2550 to about 2650 meters per minute, and preferably withdrawing at a draw-tension less than 0.4 g/d.

For warp-drawing, the yarns should desirably have an average interlace level of about 5.5 to about 9.5 RPC, and preferably less than about 7.5 RPC, and be provided with a finish that is stable enough to persist on such yarn after draw-warping in sufficient quantity and in such condition as to provide finish to enhance knitting performance.

There is also provided a process for preparing a flat multifilament interlaced textile yarn by first forming such draw-warping feed yarn by such spinning into such spin-oriented copolyester filaments of shrinkage at least about 40%, and elongation about 80% to about 180%, followed by draw-warping such feed yarn to reduce the elongation and shrinkage to the desired amounts. The resulting flat multifilament interlaced textile yarn are of poly[ethylene terephthalate/5-sodium-sulfoisophthalate] copolyester filaments containing about 2 mole % of ethylene 5-sodium-sulfo-isophthalate repeat units, being of denier about 20 to about 150, and preferably of denier at least about 40, and having a tenacity of about 1.5 to about 2.5 grams per denier, and preferably about 1.8 to about 2.2 grams per denier, in other words about 2 gpd, and elongation to break of about 10 to about 50%, preferably about 20 to about 40%, and preferably of relatively low modulus, preferably of about 40 to about 60 grams per denier, of boil-off shrinkage about 2 to about 10%, and preferably about 3 to about 7%, and especially about 5 to about 7%, and preferably a dry heat shrinkage, measured at 160° C., of about 4 to about 15%. These new yarns have been knitted into fabrics having very pleasing aesthetics, especially satin fabrics, having a pleasing softness, and have proved remarkably easy to nap (to improve their aesthetics, e.g., softness). It is believed that this advantageous property is a result of the unusually low filament strength, combined with low elongation, which is believed to be exceptional in contrast to commercially-available polyester filaments in flat textile yarns in current commercial use. For this reason, it is expected that yarns having relatively low denier per filament (dpf) below about 5 dpf will be especially useful, and particular yarns of about 1.5 to about 3 dpf. The flat yarns of the invention also have a surprising advantage in their uniformity, which can be indicated as a low standard deviation for the boil-off shrinkage, generally less than about 1%, and preferably less than about 0.25%, which contrasts favorably with prior flat copolyester yarns that have been available commercially, unless special measures are taken to improve this uniformity, which increases the cost.

As indicated, one aspect of the present invention relates to yarns consisting essentially of cationic dyeable filaments (i.e. of 2G-T/SSI copolyester), while another relates to cospinning heather yarns from the copolyester and from homopolymer (2G-T) so as to provide a mixed filament yarn with filaments that dye differently. The lower spinning speeds provide advantages downstream, as indicated, for both types of filaments. The important point for making a yarn for napping is to provide a feed yarn that will spin and process well until the time that it is desired to do the napping or brushing.

DESCRIPTION OF THE INVENTION

Many of the details of preparation and of possible variations will be readily understood by one skilled in this art. The preparation of copolyester (2G-T/SSI) polymers for making synthetic polymer filaments has already been described in the art, including the literature referred to herein, and literature referred to therein. The preparation of spin-oriented polyester filaments by melt-spinning at high withdrawal speeds was suggested by Petrille, U.S. Pat. No. 3,771,307 and by Piazza and Reese, U.S. Pat. No. 3,772,872, to prepare draw-texturing feed yarns (DTFY). Some different requirements apply for preparing flat yarns, which are not textured, and for which end-uses a severe mechanical crimp in the filaments is generally undesired. Nevertheless, so far as the substrate spin-oriented filaments are concerned, the preparation of spin-oriented polyester filaments has long been known and practiced commercially. For making and using feed yarns for draw-warping, according to the present invention, there are the following significant differences.

Those skilled in the art have known that, for making DTFY, withdrawal speeds of more than 3000 ypm are preferred to enhance aging stability and to provide a "tough" yarn capable of withstanding false-twist texturing. This has been especially true for modern texturing machines, using discs and operating at higher speeds. However, to produce warp draw feed yarns according to this invention, we employ somewhat lower withdrawal speeds of less than about 3000 ypm, and Preferably greater than about 2600 ypm, as discussed herein, especially to prepare feed yarns of less than about 4 dpf. This is because the tenacity of the resulting drawn yarn increases with the withdrawal speed of the feed yarn (when the feed yarns are drawn to the same elongations, using the same draw ratios). An inverse, but less pronounced relationship exists between withdrawal speed and drawn yarn elongation. So, a suitable withdrawal speed should be selected as indicated for the feed yarn to obtain the preferred combination in the drawn yarn of relatively low tenacity for good napping performance with sufficient elongation required for good knitting performance. We have also found that such relatively low withdrawal speeds result in fewer spinning breaks, thus helping to preserve a very high level of mechanical integrity in the yarns, which is important in running a successful warp draw process.

Another difference from DTFY, is with regard to the desirable degree of interlace. Interlacing and interlaced yarns were first disclosed in the various Bunting and Nelson patents, e.g., U.S. Pat. No. 2,985,995, and a higher degree of interlacing was disclosed by Gray in U.S. Pat. No. 3,563,021, and a procedure for rapidly measuring interlace on a device described by Hitt in U.S. Pat. No. 3,290,932. This was used to measure all the interlace herein as RPC. As explained in the art, any interlace level is measured according to the distance between interlace nodes. (The device is understood to convert these node length distances in cm to RPC, i.e., to 10 log 10 values thereof). In other words, the larger the value (representing a larger distance between interlace nodes) the lower the degree of interlace. For DTFY, a low degree of interlace (i.e., a relatively high RPC) is generally desirable; in other words, a high degree of interlace (a low RPC) is not desirable during texturing. Thus, for DTFY purposes, it is generally desirable to provide a low degree of interlace as indicated by a relatively high RPC of 11 to 12. It will be understood that any such value is an average value, since the interlace may vary widely along any individual end, so, herein, all references to interlace RPC are to the average of at least 100 measurements, and preferably an even higher number. Although one may imagine that an interlaced yarn is uniformly interlaced along each end, this is not generally achieved in practice (and may not even be desirable). In contrast to the desideratum of a low degree of interlace (high RPC) for DTFY, it is desirable for draw-warping feed yarn, according to the present invention, to provide a much higher degree of interlace (as indicated by a smaller distance between nodes, i.e., RPC of less than 10). Again, it will be understood that these interlace levels are averages; thus, in practice, there is likely to be a variation of the degree of interlace; so there may be some portions of any yarns with undesirably low degrees of interlace, corresponding to what could (if such low degree would have been maintained throughout the whole yarn) have been suitable for a DTFY. According to the invention, a high degree of interlace is required because, after draw-warping (which will extend the distance between the interlace nodes, i.e., raise the RPC and lower the degree of interlace) the amount of interlace should be such as is desired for further processing of the drawn yarns, usually in fabric formation, e.g., by warp knitting. Accordingly, it is preferred that the degree of interlace be such that the (average) RPC be less than about 9.5, and it will generally be preferred to have an even higher degree of interlace, as shown by a value of less than about 7.5. The precise amount of interlace will generally depend on what is desirable in the final fabric containing the drawn yarns, especially for aesthetic purposes. It is generally difficult to obtain a degree of interlace higher than is indicated by a value of about 5.5 RPC at the high withdrawal speeds of the order of 3000 ypm that are used herein. This higher interlace is obtained most conveniently in practice by increasing the air pressure used for interlacing. However, we have found that the higher air pressures required to obtain the preferred degree of interlacing can cause mechanical damage to the filaments and loss of efficiency in the draw warping and knitting steps. So, we prefer to provide more precise tension control in the interlacing step than is generally used for typical DTFY. Conventionally, DTFY has preferably been spun using a 2-godet system, as shown, for example, in Knox, U.S. Pat. No. 4,156,071. Some manufacturers have preferred a godet-less system for DTFY, but this is not recommended for preparing draw-warping feed yarns according to the present invention. Indeed, we prefer to provide additional godets to prevent threadline slippage and allow interlacing at relatively lower tension without damaging filaments.

Another important consideration for draw-warping feed yarns, according to the present invention is in relation to the finish. It has been customary to provide all filament yarns (as-spun) with a coating, generally referred to as a (spin-)finish, since the provision of such finish is generally the first contact of any freshly-extruded filament with any solid material, i.e., with anything other than the quenching air or any casual contact with a guide, which is usually undesirable before application of the spin-finish. According to the present invention, it is preferable to provide the feed yarn with a finish that should preferably be stable enough to presist on such yarn even after it has been draw-warped, and it should preferably persist in sufficient quantity and in such condition as to provide finish to enhance the subsequent processing of the drawn yarn, usually knitting to form the desired fabric. Hitherto, for DTFY, the objective of a spin-finish has been to maximize draw-texturing performance, as mentioned, e.g., by Piazza and Reese in U.S. Pat. No. 3,772,872, and in other publications discussing the importance of providing the optimum properties for processing on a draw-texturing machine. In contrast, just as with the interlace pin count, for a draw-warping feed yarn according to the present invention, it is desirable to provide a finish that is not only satisfactory for processing through the draw-warping machine, but also persists enough to avoid the need for further application of finish materials for subsequent processing, e.g., on a warp knitting machine. Thus a preferred finish for such draw-warping feed yarns consists of a major amount of low volatility ester, lesser amount of low volatility emulsifiers, up to about 10% of mixed antistat components, a minor, but effective amount of alkoxylated polydimethylsiloxane or perfluorinated alcohol-derived wetting agent; and a minor, but effective amount of antioxidant. Such finishes preferably have a viscosity between about 50 and 200 centipoise at 25° C., a smoke point of greater than 140° C., and volatility less than 30% at 200° C. and less than 15% at 180° C., when a 1.0 gram sample is exposed in a forced draft oven for 120 minutes. Thus an acceptable finish used for such draw-warping feed yarns is "Lurol 2233", available from the George A. Goulston Company, 700 N. Johnson Street, Monroe, NC 28110.

Thus, although it might be feasible to use alternative feed yarns for draw-warping, and then to make the corresponding adjustments during or after the draw-warping process, before further processing, e.g., knitting, it is preferable and more economical to provide all the desired characteristics in the actual draw-warping feed yarn. Thus, for example, it is feasible to increase the degree of interlacing on certain draw-warping machines that are provided with interlacing air jets, but this would increase the cost of the draw-warping process, so is not as preferred as providing sufficient interlace in the feed yarn. Similarly, it might be feasible to apply further finish during or after the draw-warping process, and this is sometimes referred to as overlubing, but this again would increase the cost. It will also be understood that some finishes that may have been suggested or even applied for DTFY could possibly have the capability of persisting through a draw-warping operation, depending on the processing conditions, and so, if applied in sufficient amount, may prove equally suitable for use with draw-warping feed yarns according to the present invention, even if this use has not previously been suggested. However, not all finishes that have been used commercially and that have proved extremely satisfactory during the draw-texturing of DTFY have proved satisfactory for use for draw-warping feed yarns according to the present invention. Some prior DTFY finishes have fumed excessively, and this can present an unpleasant situation, or even a toxic hazard to operators unless special measures are taken to avoid this problem, whereas most draw-texturing machines are constructed differently, so that this problem is not so apparent, or sufficient fumes are vented away in the course of normal operation without the need (and cost) of providing special measures.

Draw-warping is a process that has achieved considerable technical and commercial interest in recent years, because of its commercial advantages, and has been described in many publications, including Seaborn, U.S. Pat. No. 4,407,767, and by Frank Hunter in Fiber World, September, 1984, pages 61–68, in articles in Textile Month, May, 1984, pages 48–50 and March, 1985, page 17, and in Textile World, May, 1985, page 53, and in other articles, including the February, 1985, issue of Chemiefasern/Texteilindustrie, and there are several commercial firms offering commercial draw-warping machines and systems, who have provided literature and patents. Thus, the concept and practice of draw-warping is already known to those skilled in the art. Various terms, such as "warp-drawing" and "draw-beaming" have been used additionally, but, primarily, herein, the term "draw-warping" is used.

As has been indicated already, and as is evident hereafter, it is feasible to provide new flat yarns according to the invention that have many interesting and advantageous properties, and some of these are quite surprising. Perhaps among the most surprising is that such copolyester filaments can provide fabrics of pleasing aesthetics, primarily softness (in addition to the bright colors that can be obtained on account of the affinity to cationic dyestuffs), and that these pleasing aesthetics may be further enhanced by a process known as brushing or napping. Indeed, fabrics containing the flat yarns according to the invention have been found particularly and surprisingly adaptable to napping, and it is believed that the energy requirements and even the number of passes necessary to achieve a desired effect is less than has been experienced with fabrics containing existing commercial polyester yarns, and this is of great interest and economic advantage. It is believed that this ability can now be rationalized by tensile characteristics of the new flat yarns of the invention, since it is believed that such filaments break more easily during the napping (or brushing) process than conventional polyester filaments that are commercially available. This ability may well be a result of the lower tensile strength and/or modulus, which is believed to be lower than that of comparable commercially-available flat yarns even from the same copolyester (2G-T/SSI). In this respect, it will be understood that it is desirable to provide filaments and yarns that have sufficiently good tensile properties (including informity) so that they can provide textile processing, without excessive filament breaks, e.g., during the draw-warping and knitting operations, but provide the desired broken filaments during the brushing operation with a minimal number of passes and consumption of energy, since broken filaments at an earlier stage in processing is undesired because it can cause processing difficulties and even stoppage of the machine and rejection of the fabric or yarns for poor quality reasons. Thus, there is a fine line between the ability to provide good performance during brushing and the ability to withstand earlier processing, and this ability to satisfy both requirements has been demonstrated to a surprising degree by the new flat yarns according to the present invention.

The invention is further illustrated in the following Examples. All of the feed yarns according to the invention were of 2G-T/SSI copolyester as such or cospun with 2G-T, and were spin-oriented filaments prepared by high speed spinning as described herein at withdrawal speeds of about 2800-2900 ypm. Most of the properties herein are measured as described in Knox U.S. Pat. No. 4,156,071, the method for determining LRV is disclosed in Most, U.S. Pat. No. 4,444,710, and the interlace pin count is measured by the device described by Hitt in U.S. Pat. No. 3,290,932.

EXAMPLE 1

A 90 denier (100 dtex), clear, copolyester feed yarn was prepared for draw warping according to the invention with high interlace and a suitable finish, as described hereinbefore. Feed yarn properties are given in Table IA.

TABLE IA

| Denier | 88 |
| % Denier Spread | 3.2 |
| Draw Tension (1.71× @ 185° C.) | 33.1 |
| Interlace, RPC | 6.5 |
| Filament Shape | trilobal |
| No. of filaments | 34 |
| % FOY | 0.78 |
| % TiO$_2$ | 0.002 |

TABLE IA-continued

| Polymer LRV | 13.2 |

This feed yarn was draw warped at 1.51 draw ratio in various different arrangements on both a Karl Mayer draw warper and a Barmag draw warper: on the Mayer equipment with a stationary hot draw pin, on the Barmag equipment using the relax plate for heat setting and on the Barmag equipment using the standard set plate for heat setting. Process conditions (speed, set plate temperature, and overfeed) were varied with each of these arrangements. Each process gave textile yarns having desirably low boil off shrinkages and tenacity values while keeping the elongation to break adequately high. Although some differences were found in resulting flat yarn properties from the various equipment arrangements, the differences were generally small when similar process settings are used.

The process settings when using the standard Mayer draw warper (with a stationary hot draw pin) involved using a draw ratio of 1.51 X, and temperatures of 60° C. for all the rolls, of 85° C. for the predraw plate and of 100° C. for the draw pin, whereas the speeds varied from 300 to 500 ypm, the set plate temperature varied from 150 to 180° C., and there was used from zero up to 5% overfeed (for relaxing). The tenacities of the resulting flat (textile) yarns ranged from 1.9 to 2.4 gpd, being mostly from 2.0 to 2.3 gpd, with elongations of from 25 to 355, and modulus from 45 to 60 gpd, boil-off shrinkage generally about 5% (with one at 7.8% and another at 5.9%) and excellent shrinkage uniformity as shown by a standard deviation of less than 1% and mostly less than 0.25% , and dry heat shrinkages (160° C.) mostly less than about 7%, with one value at about 9%. Higher tenacity (with lower elongation) can be obtained by using higher draw ratios, but this will tend to reduce the knitting and napping performance of the resulting yarn. Lower tenacity and higher elongations can be obtained at lower draw ratios, but this will result at some point in high denier spread and fabric defects.

A continuity run was made using this feed yarn and the Mayer draw warper with the setting given in Table IB to evaluate the potential for finish deposits. The feed yarn ran well, and no finish deposits or smoke were noted during the run.

TABLE IB

| Beaming Speed | 300 ypm |
| Roll Temperature | 60° C. |
| Predraw Plate Temperature | 85° C. |
| Draw Pin Temperature | 100° C. |
| Set Plate Temperature | 155° C. |
| Draw Ratio | 1.51 |
| Percent Relaxation | 0 |
| Resulting flat (textile) yarn properties were: | |
| Denier | 63 |
| Modulus gpd | 51.0 |
| Tenacity gpd | 2.1 |
| Elongation % | 33.4 |
| Boil-off-shrinkage % | 3.8 |
| Dry Heat Shrinkage % | 5.1 |

The ranges of process control and yarn properties resulting from draw-warping on the Barmag machine are given in Table IC.

TABLE IC
BARMAG WARPER TESTS AND RESULTING YARN PROPERTIES

|  | Constant Process Controls | Variable Process Controls |
|---|---|---|
| A. Barmag with Heat Setting Done on Relax Plate | | |
| Roll 2 Temp. | 60° C. | Relax Plate Temp. 150 to 180° C. |
| Roll 3 (Draw Roll) Temp. | 85° C. | Speed 300 to 500 m/m |
| Draw Ratio | 1.50× | Percent Relaxation Zero to 5% |
| Set Plate Temp. | Off | |
| B. Barmag with Heat Setting on Set Plate | | |
| Roll 2 Temp. | 60° C. | Speed 300 to 600 m/m |
| Roll 3 Temp. | 85° C. | Set Plate Temp. 140 to 180° C. |
| Draw Ratio | 1.50× | |
| Relax Plate Temp. | Off | |
| Zero Percent Relaxation | | |

| Resulting Yarn Properties (Total Range) | | |
|---|---|---|
|  | A | B |
| Denier | 58.5–61.5 | 58.6–59.0 |
| Tenacity, g/d | 1.9–2.4 | 2.1–2.4 |
| Elongation to Break, % | 30.5–49.6 | 27.9–34.7 |
| Modulus, g/d | 44.7–59.6 | 58.7–68.1 |
| Boil-off-Shrinkage % | 3.7–18.7 | 5.3–12.7 |
| Dry Heat Shrinkage at 160° C., % | 5.1–22.1 | 6.7–12.5 |

EXAMPLE 2

A 175 denier, clear copolyester feed yarn was produced in essentially similar manner and draw warped on a Karl Mayer draw warper. Feed yarn properties are in Table II.

TABLE II

| Denier | 175 |
|---|---|
| % Denier Spread | 1.6 |
| Draw Tension (1.71 at 185° C.) | 68.0 |
| Filament shape | trilobal |
| Number of filaments | 50 |
| Interlace, RPC | 6.6 |
| % FOY | 0.66 |
| % TiO$_2$ | 0.02% |
| Polymer LRV | 13.2 |

This feed yarn was draw warped at 1.51 draw ratio on a Karl Mayer draw warper using an unheated rolling pin for draw instead of the standard hot stationary draw pin, and the same ranges for process variables (speed, set plate temperature and over feed) as in Example 1. For this test series, the roll temperature was kept constant at 85° C. and the predraw plate heater was turned off. The resulting flat textile yarns had tenacities of from 2.0 to 2.3, with one at 2.4 gpd with elongations between 35 and 45%, and modulus from about 45 to 55 gpd, and boil-off shrinkages again about 5% or less, with one value at 7.6%, and another at 5.8%, and good shrinkage uniformity, as shown by a standard deviation of 1% or less and several about 2–5% or less, and likewise low dry heat shrinkages (160° C.) of less than 9% and generally 7% or less.

This same feed yarn was processed at a mill on a standard Karl Mayer draw warper with a stationary hot draw pin and used to make unusually soft, lustrous and easily napped fabrics. During these runs the defect level during draw warping was found to be approximately 0.010 D/MEY which is considerably lower than required for a successful draw warp operation. D/MEY is an expression used to indicate the number of defects per "million end yards", so a value of 0.010 D/MEY is an extremely low defect level.

EXAMPLE 3

A 60 denier, semi-dull, copolyester feed yarn for draw warping was produced on existing DTFY spinning equipment and draw warped on a Mayer draw warper. The feed yarn had the following properties:

| Denier | 60 |
|---|---|
| Denier Spread | 1.9 |
| Draw Tension, g | 22.0 |
| Interlace, RPC | 6.5 |
| Number of Filaments | 27 |
| Filament Shape | Trilobal |
| Polymer LRV | 12.9 |
| FOY, % | 0.67 |
| % TiO$_2$ | 0.3 |

The draw warping conditions were as follows:

| Process Speed | 500 ypm |
|---|---|
| Roll Temperature | 60° C. |
| Predraw Plate Temperature | 85° C. |
| Hot Pin Temperature | 105° C. |
| Set Plate Temperature | 160° C. |
| Draw Ratio | 1.51 |
| Percent Relaxation | 0% |

The drawn yarn properties resulted:

| Denier | 40 |
|---|---|
| Tenacity, g/d | 2.4 |
| Elongation % | 35.9 |
| Modulus, g/d | 45.5 |
| Boil-off-shrinkage, % | 5.2 |
| Dry Heat Shrinkage (160° C.), % | 6.8 |

The yarn gave good draw warping performance with a defect level of only 0.09 D/MEY. Since a volatile spin finish was used on the feed yarn, an overlube was applied during draw warping to provide additional protection for knitting. According to the invention, however, low fuming, non volatile finishes such as described hereafter, are preferred to be applied during spinning so that exhaust hoods and overlubing will not be required during draw warping.

EXAMPLE 4

Feed yarns (of 115 denier, 34 filaments) were cospun at 2900 ypm and 3200 ypm (17 filaments of 2G-T/SSI copolyester and 17 filaments of 2G-T homopolymer) and then draw-warped on a Karl Mayer draw-warper for purposes of comparison, and the resulting comparative data is given in the following Table:

COMPARATIVE TABLE

| Spinning | | |
|---|---|---|
| Withdrawal speed (ypm) | 2900 | 3200 |
| QB/M lbs | 1.1 | 2.3 |
| Feed Yarn | | |
| Tenacity, g/d | 2.9 | 3.4 |
| Elongation at Break, % | 30.7 | 30.8 |
| Draw-Warping | | |
| Tension, g | 30 | 14 |

-continued

COMPARATIVE TABLE

| defects/set | 0.0 | 1.5 |

QB/M are the numbers of quality breaks per thousand pounds of yarn spun, and the defects/set are the numbers of defects over 4 beams, so the improvement obtained by reducing the withdrawal speed from 3200 to less than about 3000 ypm is clearly apparent.

As will be evident to those skilled in the art, many variations are possible, without departing from the concept of the invention. For instance, the polymer may contain additives, such as $TiO_2$, which is a conventional additive, and variation of the $TiO_2$ content can be used to differentiate the luster of the filaments, e.g., from clear through semi-dull to matte. Thus, suitable contents of $TiO_2$ may vary from about 0 up to about 2%. Similarly, other additives may be included. Furthermore, although conventionally the 2G-T/SSI copolyester has contained about 2 mole % of 5-sodium-sulfo-isophthalate residues, instead of terephthalate residues, the precise amount may be varied, as taught in the art, to obtain more or less affinity for cationic dyestuffs, and so a deeper or lighter dyeing in the ventual filaments, or to obtain other results that may be advantageous from this variation. Other variations may be made to the preparation or processing of the filaments and yarns, even if this has not been specifically disclosed in the Examples herein. It may also be advantageous to use mixtures of cross-sections and deniers for aesthetic or other purposes.

We claim:

1. An improved process for preparing an interlaced multifilament feed yarn of denier about 40 to about 300, of high shrinkage about 40% or more, and of high elongation about 80 to about 180%, of spin-oriented poly-[ethylene terephthalate/5-sodium-sulfo-isophthalate] copolyester filaments containing about 2 mole% of ethylene 5-sodium sulfo-isophthalate repeat units, by melt-spinning such filaments, applying a spin-finish and interlacing, wherein the improvement is characterized by melt-spinning the filaments at a withdrawal speed of less than about 3000 ypm.

2. A process according to claim 1, characterized in that the filaments are withdrawn at a draw-tension less than 0.4 g/d.

3. A process according to claim 1, characterized in that the withdrawal speed is from about 2550 to about 2650 meters per minute.

4. A process according to claim 2, characterized in that the withdrawal speed is from about 2550 to about 2650 meters per minute.

5. A process according to any of claims 1 to 3, or 4 wherein the average interlace level is from about 5.5 to about 9.5 RPC.

6. A process according to any of claims 1 to 3, or 4 wherein the average interlace level is from about 5.5 to about 7.5 RPC.

* * * * *